United States Patent
Ha et al.

(10) Patent No.: US 9,353,298 B2
(45) Date of Patent: May 31, 2016

(54) ACRYLIC EMULSION PRESSURE SENSITIVE ADHESIVE COMPOSITION INCLUDING NANOMETER SCALE LATEX PARTICLES WITH MONOMODAL PARTICLE SIZE DISTRIBUTION AND METHOD OF PREPARING THE SAME

(71) Applicant: LG CHEM, LTD., Seoul (KR)

(72) Inventors: Jae Woung Ha, Daejeon (KR); Young-Min Kim, Daejeon (KR); Jung Sup Han, Daejeon (KR); Kong Ju Song, Daejeon (KR); Mi Young Kim, Daejeon (KR); Kumhyoung Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/413,998

(22) PCT Filed: Oct. 8, 2013

(86) PCT No.: PCT/KR2013/008961
§ 371 (c)(1),
(2) Date: Jan. 9, 2015

(87) PCT Pub. No.: WO2014/058199
PCT Pub. Date: Apr. 17, 2014

(65) Prior Publication Data
US 2015/0344746 A1   Dec. 3, 2015

(30) Foreign Application Priority Data

Oct. 9, 2012 (KR) .................... 10-2012-0111648

(51) Int. Cl.
| | |
|---|---|
| *C09J 9/00* | (2006.01) |
| *C09J 7/02* | (2006.01) |
| *C09J 11/06* | (2006.01) |
| *C09J 133/08* | (2006.01) |
| *C09J 4/00* | (2006.01) |

(52) U.S. Cl.
CPC .......... *C09J 133/08* (2013.01); *C09J 4/00* (2013.01); *C09J 7/0217* (2013.01); *C09J 9/00* (2013.01); *C09J 11/06* (2013.01); *C08L 2201/52* (2013.01)

(58) Field of Classification Search
None
See application file for complete search history.

(56) References Cited

U.S. PATENT DOCUMENTS

2012/0015201 A1   1/2012   Zecha et al.
2013/0143999 A1   6/2013   Tanaka et al.

FOREIGN PATENT DOCUMENTS

| JP | 2003-335805 A | 11/2003 |
|---|---|---|
| JP | 2005-200440 A | 7/2005 |
| KR | 10-2010-0101844 A | 9/2010 |
| TW | 201035125 A1 | 10/2010 |
| TW | 201224103 A1 | 6/2012 |
| TW | 201229191 A | 7/2012 |
| WO | 2012053373 A1 | 4/2012 |

*Primary Examiner* — Vu A Nguyen
(74) *Attorney, Agent, or Firm* — Dentons US LLP

(57) ABSTRACT

Disclosed are an acrylic emulsion pressure-sensitive adhesive (PSA) composition and a method of preparing the same. The acrylic emulsion PSA composition with high solid content and high stability includes latex particles in which at least three anionic emulsifiers cover polymer particulates including: a (meth)acrylic acid ester monomer having a $C_1$-$C_{14}$ alkyl group as a main monomer; at least one monomer selected from the group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer; a monomer having a carboxyl group and/or a hydroxyl group as a functional monomer; and a crosslinking agent, wherein the latex particles have a nanometer scale average particle diameter and monomodal particle size distribution.

26 Claims, No Drawings

ACRYLIC EMULSION PRESSURE SENSITIVE ADHESIVE COMPOSITION INCLUDING NANOMETER SCALE LATEX PARTICLES WITH MONOMODAL PARTICLE SIZE DISTRIBUTION AND METHOD OF PREPARING THE SAME

This application is a National Stage Entry of International Application No. PCT/KR2013/008961, filed Oct. 8, 2013, and claims the benefit of Korean Application No. 10-2012-0111648 filed on Oct. 9, 2012, all of which are hereby incorporated by reference in their entirety for all purposes as if fully set forth herein

TECHNICAL FIELD

The present invention relates to an acrylic emulsion pressure-sensitive adhesive composition with high solid content and excellent coating properties which includes nanometer scale latex particles having monomodal particle size distribution and a method of preparing the same. More specifically, the present invention relates to an acrylic emulsion pressure-sensitive adhesive composition with high solid content and excellent coating properties which includes latex particles in which at least three anionic emulsifiers cover polymer particulates including: (A) a (meth)acrylic acid ester monomer having a $C_1$-$C_{14}$ alkyl group as a main monomer; (B) at least one monomer selected from the group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer; (C) a monomer having a carboxyl group and/or a hydroxyl group as a functional monomer; and (D) a crosslinking agent, wherein the latex particles have a nanometer scale average particle diameter and monomodal particle size distribution and a method of preparing the same.

BACKGROUND ART

Pressure-sensitive adhesives (PSAs) are semi-solid state materials that adhere to a material under lower pressure, are viscoelastic materials, different from adhesives, have basic properties such as initial adhesion, adhesion, and cohesion, and are used in almost all industries such as trademarks of products, advertising, printing, chemistry, medical supplies, home appliances, vehicles, office supplies, and the like.

PSAs may be classified as acrylic, rubber-based, silicon-based and EVA-based PSAs according to monomers used in preparation of PSAs and may be classified as a solvent type, an emulsion type, and a hot-melt type according to the shape thereof.

Most of conventional PSAs used in adhesive tapes, adhesive labels, and the like may be rubber-based PSAs and solvent-type PSAs. However, as demand for environmentally friendly PSAs is increasing, interest in non-solvent type PSAs is increasing and development of technologies therefor is underway. Thus, currently, development and production of non-solvent type PSAs are significantly increasing and will continue to increase. Non-solvent type PSAs are polymerized by emulsion polymerization as a representative example.

Acrylic PSAs require high solid content and low viscosity in terms of economic efficiency and enhancement of processability. The following related arts disclose a high solid content, low-viscosity acrylic PSA.

In particular, Korean Patent Application Publication No. 10-2008-0043926 discloses a water-based PSA with high solid content and low viscosity which includes micrometer scale particles or almost micrometer scale particles using two-step seed emulsion copolymerization and has bimodal or multimodal particle size distribution.

Korean Patent Application Publication No. 10-2009-0008702 discloses that an ionic surfactant and a non-ionic surfactant are used together in order to develop a high solid content acrylic emulsion PSA with low viscosity and the surfactants are separately added in a polymerization process.

In addition, U.S. Pat. No. 6,706,356 discloses a method of preparing an emulsion having bimodal or multimodal particle size distribution by supplying a plurality of pre-emulsions including different amounts of monomers as two distinct feeds to a reactor at different feed rates.

The above-described related arts disclose an acrylic emulsion PSA forming a high solid content latex and including micrometer scale or almost micrometer scale particles having bimodal or multimodal particle size distribution.

However, high solid content latexes with various particle shapes have stability problems. When a latex is low in stability, an excess amount of an agglomerate is produced during polymerization and thus a filter has a problem after polymerization and, when stored, the latex also has stability problems and thus may be hardened. Therefore, an emulsifier needs to be further added in order to enhance stability, but this may be a cause of reduction in adhesion. In addition, to maintain peeling strength of bases such as acrylic PSA-coated paper and film labels and adhesive strength of PSAs to a high level, nanometer scale latex particles having monomodal particle size distribution are needed.

DISCLOSURE

Technical Problem

As a result of a variety of intensive studies and various experiments, the inventors of the present invention confirmed that, when a pre-emulsion, which is an emulsified polymer of monomers, is mixed with an emulsion formed of at least two anionic emulsifiers alone, floating monomers or floating polymers in an aqueous solution are introduced into particles consisting of at least two anionic emulsifiers alone, thereby preparing a high solid content, low viscosity acrylic emulsion PSA composition including nanometer scale latex particles with high latex stability and having monomodal particle size distribution, thus completing the present invention.

Technical Solution

In accordance with one aspect of the present invention, provided is an acrylic emulsion pressure-sensitive adhesive (PSA) composition including latex particles in which at least three anionic emulsifiers cover polymer particulates including: a (meth)acrylic acid ester monomer having a $C_1$-$C_{14}$ alkyl group as a main monomer; at least one monomer selected from the group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer; a monomer having a carboxyl group and/or a hydroxyl group as a functional monomer; and a crosslinking agent, wherein the latex particles have a nanometer scale average particle diameter and monomodal particle size distribution and high latex stability.

In the present specification, the term "monomodal" may be defined such that, when analyzing using a particle size analyzer (Dynamic Light Scattering (DLS), Nicomp 380), standard deviation is in the range of 1% to less than 40%, preferably 1% to 35%. The term "bimodal" or "multimodal" may be defined such that, when evaluating particle size and particle size distribution using the particle size analyzer, standard deviation is 40% or greater. When the standard deviation is 40% or greater, at least two particle size peaks may be present.

The acrylic emulsion PSA composition according to the present invention includes latex particles with high latex stability, including an agglomerate in a latex in an amount of 1000 ppm or less, having a nanometer scale average particle size of, preferably, 0.1 µm to 0.4 µm, and having monomodal particle size distribution and thus has high sustainability for a base and itself has high adhesive strength.

In addition, the acrylic emulsion PSA composition according to the present invention is a high solid content, low-viscosity acrylic emulsion PSA composition and, in particular, has a high solid content of 60% or greater and a viscosity of 500 cps to 1500 cps.

The acrylic emulsion PSA composition may be prepared using at least three anionic emulsifiers.

In a specific embodiment of the present invention, a method of preparing the acrylic emulsion PSA composition may include the following processes (i) to (iv). However, embodiments of the present invention are not limited to the example.

The process (i) involves preparing an emulsion formed of at least two anionic emulsifiers alone. Separate from the following pre-emulsion preparation process, the emulsion including at least two anionic emulsifiers and water is prepared.

Through this process, stable, several nanometer-sized initial micelles are stably formed.

The process (ii) involves preparing a pre-emulsion through emulsion polymerization of a main monomer, an auxiliary monomer, and a functional monomer. In the process (ii), the pre-emulsion is prepared by mixing, with water, a (meth) acrylic acid ester monomer having a $C_1$-$C_{14}$ alkyl group as a main monomer; at least one monomer selected from the group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer; a monomer having a carboxyl group and/or a hydroxyl group as a functional monomer; a crosslinking agent; and at least two anionic emulsifiers.

Through this process, nanometer scale latex particles are included in the pre-emulsion.

The at least two anionic emulsifiers used in the process (i) and the at least two anionic emulsifiers used in the process (ii) may differ.

In particular, the at least two anionic emulsifiers of the process (i) may include at least two materials selected from the group consisting of sodium polyoxyethylene lauryl ether sulfate, sodium lauryl sulfate, and sodium alkyl diphenyloxide disulfonate.

The at least two anionic emulsifiers of the process (ii) may include at least one material selected from the group consisting of sodium polyoxyethylene lauryl ether sulfate, sodium lauryl sulfate, and sodium alkyl diphenyloxide disulfonate and sodium dioctyl sulfosuccinate.

The process (iii) involves adding a polymerization initiator to the emulsion and continuously adding the pre-emulsion and the polymerization initiator in an equal ratio for a predetermined period of time.

In a non-limiting embodiment of the present invention, the amount of the polymerization initiator added to the emulsion may be 0.001 parts by weight to 0.02 parts by weight based on 100 parts by weight of the main monomer. The amount of the polymerization initiator added together with the pre-emulsion may be 0.1 parts by weight to 0.5 parts by weight based on 100 parts by weight of the main monomer. The predetermined period of time may be between 3 and 5 hours.

Through this process, floating monomers or polymers in an aqueous solution are introduced into the initial micelles produced through the process (i).

The process (iv) involves heat polymerization of the resulting emulsion of the process (iii) in the presence of a polymerization initiator. Through this process, polymerization of monomers occurs.

In this case, the polymerization initiator may be further added in an amount of 0.001 parts by weight to 0.02 parts by weight based on 100 parts by weight of the main monomer. The heat polymerization may be performed at a temperature of 75° C. to 85° C. for about 40 minutes to about 80 minutes.

The polymerization initiator may be a polymerization initiator commonly used in the art and, in particular, may be at least one material selected from among persulfates of ammonium or alkali metals and hydrogen peroxide.

The acrylic emulsion PSA composition prepared using the above-described method is used as a main component of a PSA after neutralization with an alkaline material. The alkaline material may be an inorganic material such as a hydroxide, chloride, carbonate or the like of a monovalent or divalent metal, ammonia, an organic amine, or the like. More preferably, the alkaline material may be ammonia.

The method of preparing the acrylic emulsion PSA composition includes simplified manufacturing processes including: dual processes of emulsion preparation and pre-emulsion preparation; and mixing of the pre-emulsion with the emulsion and thus may have higher processability and productivity than conventional methods of preparing a high solid content, low-viscosity acrylic emulsion PSA composition.

Types of the main monomer, the auxiliary monomer, the functional monomer, the crosslinking agent, and the anionic emulsifiers are not particularly limited.

In particular, the (meth)acrylic acid ester monomer having a $C_1$-$C_{14}$ alkyl group as a main monomer may be at least one material selected from the group consisting of methyl(meth) acrylate, ethyl(meth)acrylate, propyl(meth)acrylate, isopropyl(meth)acrylate, butyl(meth)acrylate, t-butyl(meth)acrylate, 2-ethylhexyl(meth)acrylate, octyl(meth)acrylate, and lauryl(meth)acrylate. Preferably, the (meth)acrylic acid ester monomer having a $C_1$-$C_{14}$ alkyl group as a main monomer may be methyl(meth)acrylate, ethyl(meth)acrylate, butyl (meth)acrylate, 2-ethylhexyl(meth)acrylate, or octyl(meth) acrylate.

These main monomers affect loop tack and thus may be included in an amount of 70 wt % to 90 wt % based on a total weight of a mixture of the main monomer, the auxiliary monomer, and the functional monomer. When the amount of the main monomer is less than 70 wt %, satisfactory loop tack may not be achieved.

The group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer may include vinyl acetate, fluorinated nitrile, nitrile chloride, acrylonitrile, methacrylonitrile, acrylamide, styrene, α-methyl styrene, β-methyl styrene, and p-t-butyl styrene. Preferably, acrylonitrile may be used.

These auxiliary monomers affect adhesive strength of a PSA by polymerization with the main monomer and thus may be included in an amount of 10 parts by weight to 60 parts by weight based on 100 parts by weight of the main monomer. When the amount of the auxiliary monomer is less than 10 parts by weight, adhesive strength is deteriorated and thus transfer occurs when the PSA is peeled. On the other hand, when the amount of the auxiliary monomer exceeds 60 parts by weight, adhesive strength may be reduced.

The monomer having a carboxyl group and/or a hydroxyl group as a functional monomer may be at least one material selected from the group consisting of maleic anhydride, fumaric acid, crotonic acid, itaconic acid, acrylic acid, methacrylic acid, hydroxyethyl(meth)acrylate, hydroxypropyl (meth)acrylate, hydroxybutyl(meth)acrylate, hydroxyhexyl(meth)acrylate, hydroxyoctyl(meth)acrylate, hydroxylauryl (meth)acrylate, and hydroxypropylglycol(meth)acrylate. Preferably, acrylic acid, methacrylic acid, hydroxyethyl (meth)acrylate, or hydroxypropyl(meth)acrylate may be used.

These functional monomers affect adhesive strength, cohesive strength, and the like and thus the amount thereof may be 1 part by weight to 20 parts by weight based on 100 parts by weight of the main monomer. When the amount of the functional monomer is less than 1 part by weight, cohesive strength is deteriorated and thus transfer occurs when the PSA is peeled. On the other hand, when the amount of the functional monomer exceeds 20 parts by weight, adhesive strength may be reduced.

In addition, the crosslinking agent may be at least one material selected from the group consisting of allylmethacylate, polyethylene glycol diacrylate, polypropylene glycol diacrylate, ethylene glycol diacrylate, ethylene glycol dimethacrylate, hexanediol ethoxylate diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethylpropane ethoxylate triacrylate, trimethylpropane propoxylate triacrylate, pentaerythritol ethoxylate triacrylate, pentaerythritol propoxylate triacrylate, vinyl trimethoxy silane, and divinyl benzene. Preferably, allylmethacylate and polyethylene glycol diacrylate may be used.

Due to addition of the crosslinking agent, cohesive strength and re-peeling ability may be enhanced. The amount of the crosslinking agent may be 0.1 parts by weight to 1 part by weight based on 100 parts by weight of the main monomer.

The anionic emulsifiers may be selected from the group consisting of phosphates, carboxylates, sulfates, succinates, sulfosuccinates, sulfonates, and disulfonates. The amount of the at least three anionic emulsifiers may be 0.1 parts by weight to 5 parts by weight based on 100 parts by weight of the main monomer. In the emulsion preparation process, the at least three anionic emulsifiers may be added in an amount of 0.1 parts by weight to 3 parts by weight based on 100 parts by weight of the main monomer and, in the pre-emulsion preparation process, the at least three anionic emulsifiers may be added in an amount of 2 parts by weight to 6 parts by weight based on 100 parts by weight of the main monomer.

In a specific embodiment of the present invention, the at least three anionic emulsifiers may be selected from the group consisting of sodium alkyl sulfate, sodium polyoxyethylene sulfate, sodium lauryl ether sulfate, sodium polyoxyethylene lauryl ether sulfate, sodium lauryl sulfate, sodium alkyl sulfonate, sodium alkyl ether sulfonate, sodium alkylbenzene sulfonate, sodium linear alkylbenzene sulfonate, sodium alpha-olefin sulfonate, sodium alcohol polyoxyethylene ether sulfonate, sodium dioctyl sulfosuccinate, sodium perfluorooctane sulfonate, sodium perfluorobutane sulfonate, alkyl diphenyloxide disulfonate, sodium dioctyl sulfosuccinate (DOSS), sodium alkyl-aryl phosphate, sodium alkyl ether phosphate, and sodium lauroyl sarcosinate. However, embodiments of the present invention are not limited to the above-listed examples and known anionic emulsifiers may be included without departing from the scope of the invention.

Meanwhile, a chain transfer agent may be further used in the pre-emulsion preparation process. In a specific embodiment of the present invention, the chain transfer agent may be sodium carbonate or sodium methylallyl sulfonate, but embodiments of the present invention are not limited thereto. That is, any chain transfer agent having a functional group enabling homopolymers, which are polymers consisting of only one kind of monomer, to be introduced into micelles may be used in order to achieve desired effects of the present invention. The chain transfer agent may also act as an anionic emulsifier. The amount of the chain transfer agent may be 0.1 parts by weight to 1 part by weight based on 100 parts by weight of the main monomer.

The present invention also provides a protective film prepared by coating a surface or opposite surfaces of paper or film label with a water-based PSA including the acrylic emulsion PSA composition.

BEST MODE

Now, the present invention will be described in more detail with reference to the following examples. These examples are provided only for illustration of the present invention and should not be construed as limiting the scope and spirit of the present invention.

Example 1

An acrylic emulsion PSA composition according to one embodiment of the present invention may be prepared through processes described below.

To a 3 L glass reactor equipped with a thermostat, a stirrer, a dropping funnel, a nitrogen gas injection tube, and a reflux condenser were added 360 g of distilled water and 5 g (30 wt %) of sodium polyoxyethylene lauryl ether sulfate and 10 g (30 wt %) of sodium lauryl sulfate as surfactants. Air inside of the reactor was replaced with nitrogen while stirring the resulting solution and the temperature therein was raised to 80° C. in nitrogen atmosphere and maintained for 60 minutes.

Separate from the emulsion preparation process, to prepare a pre-emulsion, a solution consisting of 50 g (30 wt %) of sodium polyoxyethylene lauryl ether sulfate, 15 g (60 wt %) of sodium dioctyl sulfosuccinate, 2 g of sodium carbonate, 2 g of sodium methylallyl sulfonate, and 300 g of distilled water was added to a beaker together with a monomer mixture of 330 g of butylacrylate (BA), 930 g of 2-ethylhexylacrylate (2-EHA), 110 g of vinyl acetate, 76 g of acrylonitrile, 60 g of acrylic acid (AA), and 3 g of polyethylene glycol (400) diacrylate and the resulting solution was stirred to prepare a milky pre-emulsion.

Subsequently, 10 g (10 wt %) of ammonium persulfate was added to the glass reactor containing the emulsion and dissolved therein by stirring for 10 minutes.

The pre-emulsion and 180 g (10 wt %) of an aqueous ammonium persulfate solution were continuously added in an equal ratio to the glass reactor containing the emulsion for 4 hours, followed by further addition of 10 g (10 wt %) of an aqueous ammonium persulfate solution, and the resulting solution was maintained at a temperature of 80° C. for 1 hour and cooled to room temperature to prepare an acrylic emulsion resin.

Thereafter, 28 wt % of ammonia aqueous solution was added to the acrylic emulsion resin to adjust pH to 7.5.

Example 2

An acrylic emulsion resin was prepared in the same manner as in Example 1, except that the amount of 30 wt % sodium lauryl sulfate was twice that of 30 wt % sodium lauryl sulfate used in the emulsion preparation process.

Example 3

An acrylic emulsion resin was prepared in the same manner as in Example 1, except that 30 wt % of sodium polyoxyethylene lauryl ether sulfate and 30 wt % of sodium lauryl sulfate, among the surfactants, were used in an amount twice that of 30 wt % of sodium polyoxyethylene lauryl ether sulfate and 30 wt % of sodium lauryl sulfate used in the emulsion preparation process of Example 1.

Example 4

An acrylic emulsion resin was prepared in the same manner as in Example 1, except that the amount of 30 wt % of sodium polyoxyethylene lauryl ether sulfate among the surfactants was changed to 60 g in the pre-emulsion preparation process of Example 1.

Example 5

An acrylic emulsion resin was prepared in the same manner as in Example 1, except that the amount of 30 wt % of sodium polyoxyethylene lauryl ether sulfate among the surfactants was changed to 70 g in the pre-emulsion preparation process of Example 1.

Example 6

An acrylic emulsion resin was prepared in the same manner as in Example 1, except that 5 g (30 wt %) of sodium polyoxyethylene lauryl ether sulfate and 10 g (30 wt %) of sodium dodecyl diphenyloxide disulfonate were used as surfactants in the emulsion preparation process.

Example 7

An acrylic emulsion resin was prepared in the same manner as in Example 6, except that 30 wt % of sodium dodecyl diphenyloxide disulfonate was used in an amount twice that of 30 wt % of sodium dodecyl diphenyloxide disulfonate used in the emulsion preparation process of Example 6.

Example 8

An acrylic emulsion resin was prepared in the same manner as in Example 6, except that 30 wt % of sodium polyoxyethylene lauryl ether sulfate and 30 wt % of sodium dodecyl diphenyloxide disulfonate as surfactants were used in an amount twice that of 30 wt % of sodium polyoxyethylene lauryl ether sulfate and 30 wt % of sodium dodecyl diphenyloxide disulfonate used in the emulsion preparation process of Example 6.

Comparative Example 1

An acrylic emulsion resin was prepared in the same manner as in Example 1, except that the emulsion preparation process was omitted.

Comparative Example 2

An acrylic emulsion resin was prepared in the same manner as in Example 1, except that 10 g (30 wt %) of sodium polyoxyethylene lauryl ether sulfate was used alone as a surfactant in the emulsion preparation process.

Comparative Example 3

An acrylic emulsion resin was prepared in the same manner as in Example 1, except that 20 g (30 wt %) of sodium lauryl sulfate was used alone as a surfactant in the emulsion preparation process.

Comparative Example 4

An acrylic emulsion resin was prepared in the same manner as in Example 1, except that 15 g (60 wt %) of sodium dioctyl sulfosuccinate was used alone as a surfactant in the emulsion preparation process and 50 g (30 wt %) of sodium polyoxyethylene lauryl ether sulfate was used alone as a surfactant in the pre-emulsion preparation process.

Comparative Example 5

An acrylic emulsion resin was prepared in the same manner as in Comparative Example 4, except that 20 g (30 wt %) of sodium lauryl sulfate was used alone as a surfactant in the emulsion preparation process.

Comparative Example 6

An acrylic emulsion resin was prepared in the same manner as in Example 1, except that 130 g of an emulsion latex having a high solid content of 55 wt % and having a diameter of 150 nm and 130 g of distilled water were added to the glass reactor. The method of Comparative Example 6 is a method of preparing a high solid content, low-viscosity polymer using an existing seed.

Comparative Example 7

An acrylic emulsion resin was prepared in the same manner as in Example 1, except that 4 g (20 wt %) of sodium polyoxyethylene nonylether sulfuric ester (Hitenol KH-10), which is an anionic reactive emulsifier, was used alone as a surfactant in the emulsion preparation process and 30 g (20 wt %) of Hitenol KH-10 as an anionic reactive emulsifier was used alone as a surfactant in the pre-emulsion preparation process. The method of Comparative Example 7 is a method of preparing a high solid content, low-viscosity polymer using an anionic reactive emulsifier.

Comparative Example 8

An acrylic emulsion resin was prepared in the same manner as in Comparative Example 7, except that 8 g (20 wt %) of Hitenol KH-10 was used alone as a surfactant in the emulsion preparation process and 40 g (20 wt %) of Hitenol KH-10 was used alone as a surfactant in the pre-emulsion preparation process.

Comparative Example 9

An acrylic emulsion resin was prepared in the same manner as in Comparative Example 7, except that 13 g (20 wt %) of Hitenol KH-10 was used alone as a surfactant in the emulsion preparation process and 30 g (20 wt %) of Hitenol KH-10 was used alone as a surfactant in the pre-emulsion preparation process.

Experimental Example 1

High solid content, viscosity, agglomerate content, and particle size distribution of each of the acrylic emulsion PSAs prepared according to Examples 1 to 8 and Comparative Examples 1 to 9 were measured using the following methods, and measurement results are shown in Table 1 below.

Measurement of High Solid Content 1 g to 2 g of an emulsion latex was dropped onto an Al plate and a weight thereof before drying was measured, and the Al plate was dried in an oven at 150° C. for 20 minutes and the weight thereof was measured. The high solid content was calculated using the following equation.

$$\text{High solid content (\%)} = \frac{\text{weight before drying} - \text{weight after drying}}{\text{weight before drying}} \times 100$$

Measurement of Viscosity

The viscosity of each acrylic emulsion PSA was measured using a Brookfield DV-III Ultra viscometer. Measurement conditions were as follows: 25° C., Spindle No. LV3, and 12 rpm.

Measurement of Agglomerate Content 100 g of an emulsion latex was sieved using a standard sieve having an aperture size of 74 μm, and the sieved agglomerate was washed with distilled water until water flowing down turned transparent and dried at a temperature of 110° C. or less. A weight of the dried agglomerate and a weight of the agglomerate before drying were measured and the agglomerate content was calculated using the above-described equation.

Measurement of Particle Size Distribution

Size and size distribution of particles having a diameter of 1 μm or less were measured using a Nicomp 380 particle size analyzer.

Experimental Example 2

Each of the acrylic emulsion PSA resins of Examples 1 to 8 and Comparative Examples 1 to 9 was coated on silicon-coated release paper and the coated release paper was dried in an oven at 120° C. for 1 minute to form an acrylic adhesive resin layer having a thickness of 20 μm. The resultant release paper was laminated with paper to form a paper label and the paper label was cut to a size of 1 inch×100 mm, thereby completing fabrication of a paper label specimen. Adhesion characteristics were measured using the following methods and measurement results are shown in Table 1 below.

Peeling Strength Test

Adhesive strengths of the adhesive tape specimens were measured in accordance with JIS Z 0237 such that each adhesive tape specimen was attached to glass plate by reciprocating 2 kg of a roller over a surface of the adhesive tape specimen at a rate of 300 mm/min and aged at room temperature for 20 minutes, and the aged adhesive tape specimen was subjected to 90° peeling at a rate of 300 mm/min using TA Texture Analyzer.

Measurement of Loop Tack

The paper specimen was made so as to have a loop shape according to FINAT TEST METHOD No. 9 and then attached to a surface of glass without applying pressure thereto, and loop tack of the paper specimen was measured while peeling the paper specimen from the glass at a rate of 300 mm/min using TA Texture Analyzer (N/in).

TABLE 1

| | High Solid Content (%) | Viscosity (cps) | Average Particle Diameter (nm) | Standard Deviation (%) | Agglomerate Content (ppm) | 90° Peeling Strength (N/in) | Loop tack (N/in) |
|---|---|---|---|---|---|---|---|
| Example 1 | 63 | 800 | 280 | 27 | 500 | 7.5 | 19 |
| Example 2 | 63 | 700 | 270 | 30 | 150 | 8 | 18 |
| Example 3 | 63 | 750 | 260 | 33 | 400 | 7 | 18 |
| Example 4 | 63 | 1150 | 285 | 22 | 750 | 8 | 17 |
| Example 5 | 63 | 1400 | 300 | 20 | 800 | 7 | 17 |
| Example 6 | 63 | 700 | 280 | 25 | 900 | 8 | 18 |
| Example 7 | 63 | 750 | 280 | 20 | 700 | 8 | 17 |
| Example 8 | 63 | 850 | 275 | 25 | 650 | 7 | 17 |
| Comparative Example 1 | 63 | 160 | 200/674 binary particles | 46 | 2300 | 4.5 | 13 |
| Comparative Example 2 | 63 | 1260 | 150/600 binary particles | 43 | 1500 | 6 | 13 |
| Comparative Example 3 | 63 | 900 | 220/700 binary particles | 45 | 3000 | 6 | 10 |
| Comparative Example 4 | 64 | 4000 | 250 | 7 | 3500 | 7 | 9 |
| Comparative Example 5 | 64 | 1600 | 300 | 26 | 2300 | 5 | 7 |
| Comparative Example 6 | 64 | 2300 | 500 | 11 | 7000 | 6 | 15 |
| Comparative Example 7 | 64 | 500 | 330 | 28 | 6000 | 7 | 18 |

TABLE 1-continued

| | High Solid Content (%) | Viscosity (cps) | Average Particle Diameter (nm) | Standard Deviation (%) | Agglomerate Content (ppm) | 90° Peeling Strength (N/in) | Loop tack (N/in) |
|---|---|---|---|---|---|---|---|
| Comparative Example 8 | 63 | 2800 | 250 | 12 | 3400 | 7 | 17 |
| Comparative Example 9 | 62 | 3500 | 220 | 10 | 1500 | 6 | 15 |

From the results shown in Table 1, it can be confirmed that, unlike the acrylic emulsion resins of Comparative Examples 1 to 9, the acrylic emulsion resins of Examples 1 to 8 include particles having an average particle diameter of 400 nm or less and monomodal particle size distribution, have a high solid content of 63% or greater and a viscosity of 500 cps to 1500 cps, and include agglomerates in an amount of 1000 ppm or less. In addition, it can be confirmed that the acrylic emulsion resins of Examples 1 to 8 have higher sustainability and loop tack than those of the acrylic emulsion resins of Comparative Examples 1 to 9.

In particular, it can be confirmed that the acrylic emulsion resin of Comparative Example 1 excluding the initial micelles formed using at least two anionic emulsifiers has bimodal particle size distribution and the acrylic emulsion resins of Comparative Examples 2 to 5 using one anionic emulsifier include agglomerates in an amount of 1500 ppm or greater.

In addition, it can be confirmed that the acrylic emulsion resin with high solid content and low viscosity of Comparative Example 6 prepared using a seed has higher viscosity, has a greater average particle diameter, and includes a greater amount of agglomerate than the acrylic emulsion PSA composition according to the present invention.

In addition, it can be confirmed that the high solid content acrylic emulsion resins of Comparative Examples 7 to 9 prepared using the anionic reactive emulsifier have high viscosity or include very large amounts of agglomerates.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an acrylic emulsion PSA composition according to the present invention includes emulsified polymer particles having a nanometer scale average particle diameter and monomodal particle size distribution and thus peeling strength of a base and adhesive strength of a PSA including the acrylic emulsion PSA composition are kept at high levels.

A method of preparing the acrylic emulsion PSA composition includes simplified manufacturing processes including dual processes of emulsion preparation and pre-emulsion preparation and mixing of the pre-emulsion with the emulsion and thus may enhance latex stability, which results in enhanced processability and productivity, when compared to conventional methods of preparing a high solid content, low-viscosity acrylic emulsion PSA composition.

The invention claimed is:

1. An acrylic emulsion pressure-sensitive adhesive (PSA) composition comprising latex particles in which at least three anionic emulsifiers cover polymer particulates comprising:

a (meth)acrylic acid ester monomer having a $C_1$-$C_{14}$ alkyl group as a main monomer;
at least one monomer selected from the group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer;
a monomer having a carboxyl group and/or a hydroxyl group as a functional monomer; and
a crosslinking agent,
wherein the latex particles have a nanometer scale average particle diameter and monomodal particle size distribution.

2. The acrylic emulsion PSA composition according to claim 1, wherein an agglomerate having a particle diameter of 74 μm or greater is included in an amount of 1000 ppm or less.

3. The acrylic emulsion PSA composition according to claim 1, wherein the acrylic emulsion PSA composition has a high solid content of 60% or greater.

4. The acrylic emulsion PSA composition according to claim 1, wherein the acrylic emulsion PSA composition has a viscosity of 500 cps to 1500 cps.

5. The acrylic emulsion PSA composition according to claim 1, wherein the average particle diameter is 0.1 μm to 0.4 μm.

6. The acrylic emulsion PSA composition according to claim 1, wherein an amount of the auxiliary monomer is 10 parts by weight to 60 parts by weight based on 100 parts by weight of the main monomer.

7. The acrylic emulsion PSA composition according to claim 1, wherein an amount of the functional monomer is 1 part by weight to 20 parts by weight based on 100 parts by weight of the main monomer.

8. The acrylic emulsion PSA composition according to claim 1, wherein an amount of the crosslinking agent is 0.1 parts by weight to 1 part by weight based on 100 parts by weight of the main monomer.

9. The acrylic emulsion PSA composition according to claim 1, wherein an amount of the at least three anionic emulsifiers is 0.1 parts by weight to 5 parts by weight based on 100 parts by weight of the main monomer.

10. The acrylic emulsion PSA composition according to claim 1, wherein the (meth)acrylic acid ester monomer having a $C_1$-$C_{14}$ alkyl group is at least one material selected from the group consisting of methyl(meth)acrylate, ethyl(meth)acrylate, propyl(meth)acrylate, isopropyl(meth)acrylate, butyl(meth)acrylate, t-butyl(meth)acrylate, 2-ethylhexyl(meth)acrylate, octyl(meth)acrylate, and lauryl(meth)acrylate.

11. The acrylic emulsion PSA composition according to claim 1, wherein the group consisting of a monomer having an allyl ester group, a vinyl ester group, an unsaturated ester group, or a mixture thereof, a cyano group containing monomer, an amine group containing monomer, and a styrenic monomer having a vinyl group comprises vinyl acetate, fluorinated nitrile, nitrile chloride, acrylonitrile, methacrylonitrile, acrylamide, styrene, α-methyl styrene, β-methyl styrene, and p-t-butyl styrene.

12. The acrylic emulsion PSA composition according to claim 1, wherein the monomer having a carboxyl group and/or a hydroxyl group is at least one material selected from the group consisting of maleic anhydride, fumaric acid, crotonic acid, itaconic acid, acrylic acid, methacrylic acid, hydroxyethyl(meth)acrylate, hydroxypropyl(meth)acrylate, hydroxybutyl(meth)acrylate, hydroxyhexyl(meth)acrylate, hydroxyoctyl(meth)acrylate, hydroxylauryl(meth)acrylate, and hydroxypropylglycol(meth)acrylate.

13. The acrylic emulsion PSA composition according to claim 1, wherein the crosslinking agent is at least one material selected from the group consisting of allylmethacylate, polyethylene glycol diacrylate, polypropylene glycol diacrylate, ethylene glycol diacrylate, ethylene glycol dimethacrylate, hexanediol ethoxylate diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethylpropane ethoxylate triacrylate, trimethylpropane propoxylate triacrylate, pentaerythritol ethoxylate triacrylate, pentaerythritol propoxylate triacrylate, vinyl trimethoxy silane, and divinyl benzene.

14. The acrylic emulsion PSA composition according to claim 1, wherein the at least three anionic emulsifiers are selected from the group consisting of carboxylates, phosphates, sulfates, succinates, sulfosuccinates, sulfonates, and disulfonates.

15. The acrylic emulsion PSA composition according to claim 14, wherein the at least three anionic emulsifiers are selected from the group consisting of sodium alkyl sulfate, sodium polyoxyethylene sulfate, sodium lauryl ether sulfate, sodium polyoxyethylene lauryl ether sulfate, sodium lauryl sulfate, sodium alkyl sulfonate, sodium alkyl ether sulfonate, sodium alkylbenzene sulfonate, sodium linear alkylbenzene sulfonate, sodium alpha-olefin sulfonate, sodium alcohol polyoxyethylene ether sulfonate, sodium dioctyl sulfosuccinate, sodium perfluorooctane sulfonate, sodium perfluorobutane sulfonate, alkyl diphenyloxide disulfonate, sodium dioctyl sulfosuccinate (DOSS), sodium alkyl-aryl phosphate, sodium alkyl ether phosphate, and sodium lauroyl sarcosinate.

16. A protective film formed by coating a surface or opposite surfaces of a film with a water-based PSA including the acrylic emulsion PSA composition according to claim 1.

17. A method of preparing the acrylic emulsion PSA composition according to claim 1, the method comprising:
preparing an emulsion comprising at least two anionic emulsifiers and water, separate from a process of preparing a pre-emulsion below;
preparing a pre-emulsion by mixing, with water, a (meth) acrylic acid ester monomer having a $C_1$-$C_{14}$ alkyl group as a main monomer; at least one monomer selected from the group consisting of a monomer having an allyl ester group, a vinyl ester group, an unsaturated ester group, or a mixture thereof, a cyano group containing monomer, an amine group containing monomer, and a styrenic monomer having a vinyl group, as an auxiliary monomer; a monomer having a carboxyl group and/or a hydroxyl group as a functional monomer; a crosslinking agent; and at least two anionic emulsifiers;
adding a polymerization initiator to the emulsion and continuously adding the pre-emulsion and the polymerization initiator in an equal ratio; and
performing heat polymerization of the resulting emulsion of the adding in the presence of a polymerization initiator.

18. The method according to claim 17, wherein an amount of the at least two anionic emulsifiers used in the preparing of the emulsion is 0.1 parts by weight to 3 parts by weight based on 100 parts by weight of the main monomer.

19. The method according to claim 18, wherein an amount of the at least two anionic emulsifiers used in the preparing of the pre-emulsion is 2 parts by weight to 6 parts by weight based on 100 parts by weight of the main monomer.

20. The method according to claim 17, wherein an amount of the polymerization initiator added to the emulsion is 0.001 parts by weight to 0.02 parts by weight based on 100 parts by weight of the main monomer.

21. The method according to claim 17, wherein an amount of the polymerization initiator added together with the pre-emulsion is 0.1 parts by weight to 0.5 parts by weight based on 100 parts by weight of the main monomer.

22. The method according to claim 17, wherein an amount of the polymerization initiator used in the performing is 0.001 parts by weight to 0.02 parts by weight based on 100 parts by weight of the main monomer.

23. The method according to claim 17, wherein a chain transfer agent is further used in the preparing of the pre-emulsion, in an amount of 0.1 parts by weight to 1 part by weight based on 100 parts by weight of the main monomer.

24. The method according to claim 17, wherein the at least two anionic emulsifiers used in the preparing of the emulsion and the at least two anionic emulsifiers used in the preparing of the pre-emulsion differ.

25. The method according to claim 24, wherein the at least two anionic emulsifiers used in the preparing of the emulsion comprise at least two materials selected from the group consisting of sodium polyoxyethylene lauryl ether sulfate, sodium lauryl sulfate, and sodium alkyl diphenyloxide disulfonate, and the at least two anionic emulsifiers used in the preparing of the pre-emulsion comprise at least one material selected from the group consisting of sodium polyoxyethylene lauryl ether sulfate, sodium lauryl sulfate, and sodium alkyl diphenyloxide disulfonate and sodium dioctyl sulfossucinate.

26. The acrylic emulsion PSA composition according to claim 1, wherein the monomodal is defined such that, when analyzing using a particle size analyzer (Dynamic Light Scattering (DLS), Nicomp 380), standard deviation is in a range of 1% to less than 40%.

\* \* \* \* \*